United States Patent [19]
Hamill et al.

[11] Patent Number: 4,589,399
[45] Date of Patent: May 20, 1986

[54] PORTABLE COOKING DEVICE

[76] Inventors: Stephen D. Hamill, Rte. 1, Box 579B; Arthur A. Knight, 1200 Avenida Manana, both of Roswell, N. Mex. 88201

[21] Appl. No.: 712,535

[22] Filed: Mar. 18, 1985

[51] Int. Cl.⁴ .................... A47J 37/00; F24B 3/00
[52] U.S. Cl. .................... 126/30; 126/9 R; 126/25 A
[58] Field of Search .......... 126/9 R, 9 A, 9 B, 25 R, 126/29, 30, 25 AA; 99/450, 339

[56] References Cited

U.S. PATENT DOCUMENTS

| | | | |
|---|---|---|---|
| 889,187 | 6/1908 | Ball, Jr. | 126/29 |
| 1,091,877 | 3/1914 | Collis | 126/30 |
| 2,977,953 | 4/1961 | Dowdy | 126/30 |
| 2,985,164 | 5/1961 | Imoto | 126/9 R |
| 3,094,113 | 6/1963 | Avila | 126/30 |
| 4,126,116 | 11/1978 | McCallum | 126/9 R |
| 4,437,450 | 3/1984 | Connelly | 126/30 |
| 4,475,528 | 10/1984 | Kuchenbrod | 126/9 R |

Primary Examiner—James C. Yeung
Attorney, Agent, or Firm—Harness, Dickey & Pierce

[57] ABSTRACT

A lightweight, foldable, compact, portable cooking device having a vertical support member which provides a location for adjustable attachment of cooking and fire grates. Cooking and fire grates are hinged and the support member disassembles into multiple segments thereby permitting the entire implement to be collapsed to satisfy compact storage requirements.

7 Claims, 16 Drawing Figures

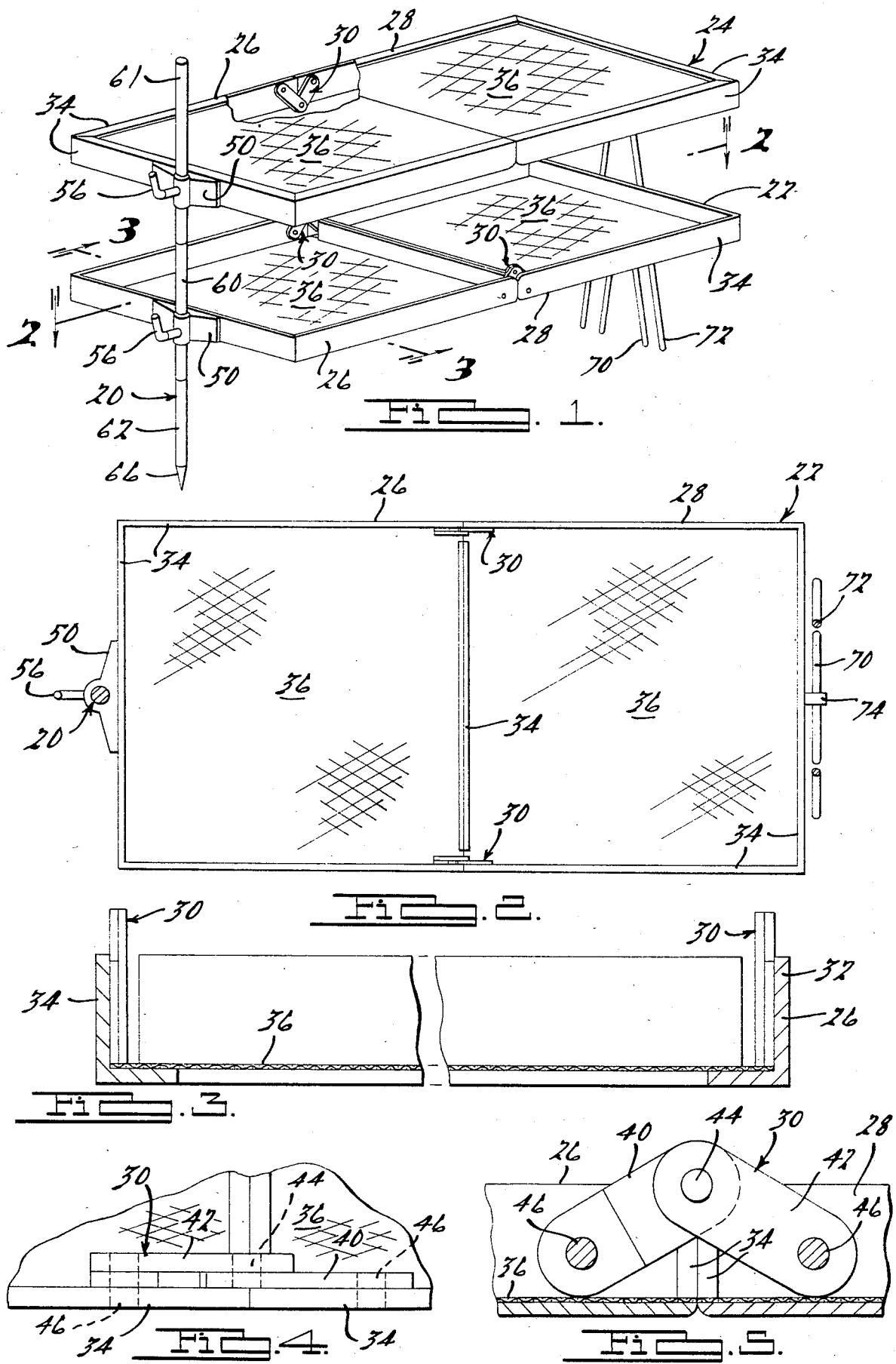

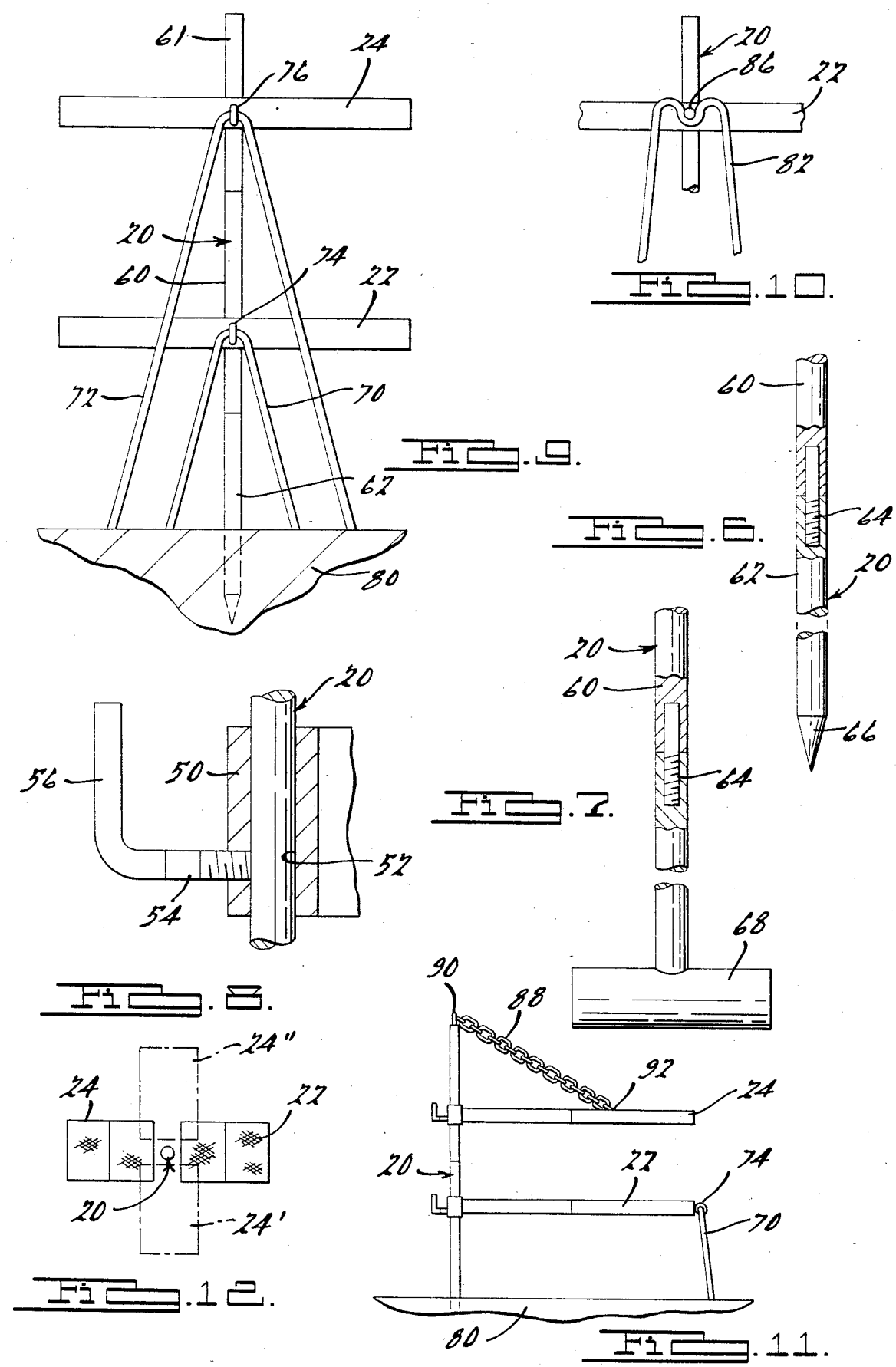

PORTABLE COOKING DEVICE

BACKGROUND OF THE INVENTION AND DESCRIPTION OF THE PRIOR ART

The present invention relates to portable cooking devices and is more particularly directed to lightweight, foldable, portable cooking devices which provide for adjustable disposition of cooking and fire grates.

The variables encountered in the outdoor environment field present unique problems in the packaging and use of the outdoor cooking equipment. For example, to achieve portability, such equipment must be constructed of lightweight materials, be compact or collapsible to small proportions, and yet be versatile to accomodate different conditions.

Portable cooking implements have been devised in the past. Representative of such art is U.S. Pat. No. 4,433,671. That patent, however, which is similar to known portable cooking grills and devices, does not permit infinite adjustment of the fire and cooking grates with respect to the ground, or with respect to one another. That device also does not permit leveling of the cooking and fire grates when the implement is used on uneven surfaces, nor does it collapse to a compact unit.

The present invention is an improvement over known portable cooking devices and provides a lightweight, foldable, compact, portable cooking device which allows adjustment of the elevation of both the fire and cooking grates to accommodate any surface and situation, allows leveling of both the fire and cooking grates, and has a collapsible construction which results in a minimal external storage profile.

In particular, the present invention consists of three main elements: a vertical support means (pole), a fire grate and a cooking grate. The fire grate and cooking grate are removeably and slidably attached to the vertical support means and are each hingedly divided into sections for compaction and storage purposes. Similarly, the vertical support means comprises a tubular member which is made up of several segments for storage purposes and preferably has a pointed end for insertion in the ground. The cooking and fire grates each have a frame to which a tubular sleeve is attached. The vertical support member is inserted within the tubular sleeves of the fire and cooking grates and the grates are adjustably held in place by set screws. Both grates can be set and releaseably locked at any selected elevation on the vertical support means. Adjustment of the fire grate elevation relative to the ground permits control of the air flow thereby controlling fuel burn rate and temperature. Similarly, adjustment of the cooking grate relative to the fire grate permits control of the cooking time and temperature. The fire grate alternately can be used as a second cooking grate.

The fire and cooking grates may be supported by using a single vertical support post or multiple vertical support post which have been driven into the ground. The infinite range of adjustability, featured by the vertical support posts, permits leveling of the fire and cooking grates on even the roughest surface conditions.

The embodiments as herein described achieve the features of the invention by allowing leveling of the fire and cooking grates, permitting infinite adjustability of both the fire and cooking grate elevations, and providing hinged fire and cooking grates and a vertical support post which may be separated into segments and folded or collapsed thereby allowing the invention to be collapsed to a minimum storage profile.

Additional objects and advantages of the present invention will become apparent from reading the detailed description of the preferred embodiment which makes reference to the following set of drawings.

BRIEF DESCRIPTION OF THE DRAWINGS

FIG. 1 is a perspective view of the invention;

FIG. 2 is a cross-sectional view of the invention shown in FIG. 1, the cross-section being taken along lines 2—2 in FIG. 1.

FIG. 3 is a cross-sectional view of the invention shown in FIGS. 1 and 2, the cross-section taken along lines 3—3 in FIG. 1;

FIG. 4 is a partial view of a hinge mechanism used with the present invention;

FIG. 5 is a side elevational view of the hinge mechanism shown in FIG. 4;

FIG. 6 illustrates an assembled vertical support pole used with the present invention;

FIG. 7 illustrates an alternate foot-like extension for the vertical support pole;

FIG. 8 illustrates the assembly of a frame member to the support pole;

FIG. 9 depicts a side elevational view of the invention showing the end support members;

FIG. 10 shows an alternate form of end support members;

FIG. 11 illustrates an alternate arrangement for supporting the grates;

FIG. 12 schematically depicts various arrangments of the components of the present invention and thereby showing its versatility;

DETAILED DESCRIPTION OF THE PREFERRED EMBODIMENTS

Figure 13:
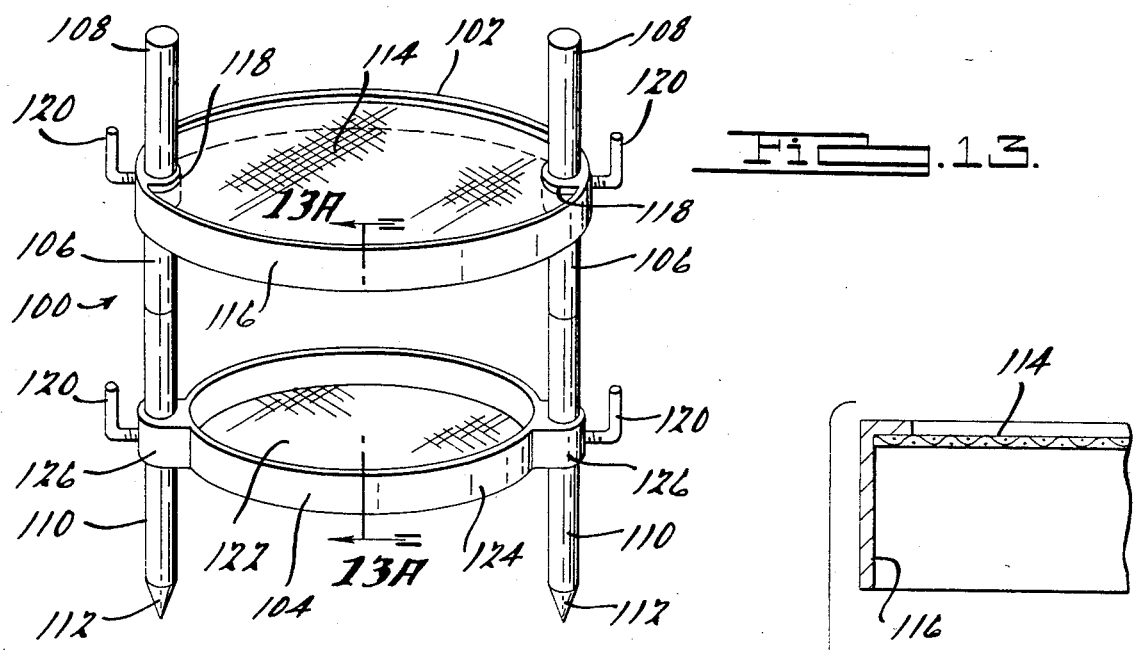
FIG. 13 illustrates an alternate embodiment of a portable cooking grill.
Figure 13A:
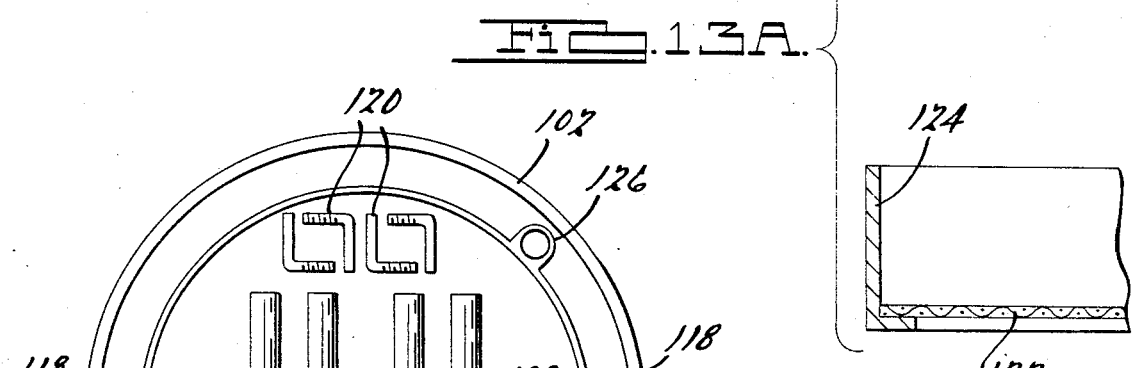
FIG. 13A is a cross-sectional view taken along lines 13A—13A in FIG. 13.

FIG. 1 illustrates one preferred embodiment of a portable cooking device 18 according to the present invention. As shown in FIG. 1, the portable cooking device 18 consists of a vertical support pole 20 to which a fire grate 22 and a cooking grate 24 are slidably and rotatably attached. The fire grate 22 and the cooking grate 24 are preferably identical and either can be used for cooking or for placement of a fire, or both can be used for cooking as desired.

The fire grate 22 has two sections 26 and 28 which are hingedly attached together by a pair of hinges 30. As shown in FIGS. 1-3, each of the sections 26 and 28 is made of a polygonal frame 32 of L-shaped sides 34 and a metal mesh grill 36. The sides 34 are securely connected together, as by welding, to form the frame 32. The grill 36 is securely attached to the frame 32, also preferably by welding.

The cooking grate 24 has the same structure as the fire grate 26 and the components are numbered similarly.

The hinges 30 allow the two sections 26 and 28 of each grate 22 and 24 to rotate 180° and fold over on top of one another for storage. The hinges 30 each comprise two arm members 40 and 42 which are pivotably secured together at one end by a pivot pin 44. The other ends of the arm members 40 and 42 are secured to the sides 34 of the frame 32 by additional pivot pins 46.

A sleeve member 50 is provided on one end of each of the grates 22 and 24. The sleeve member 50 has an elongated passageway 52 which fits over the support pole 20 and allows the pole to slide within it (See FIG. 8). A set screw 54 tightened and loosened by an attached handle 56 is used to secure the grates to the pole at any desired position or orientation.

As shown in FIG. 6, the support pole 20 is preferably made of two or more sections 60 and 62 which are held together by a dowel and screw mechanism 64. (A support pole 20 consisting of three sections 60, 61 and 62 is shown in FIGS. 1 and 9). The two or three-part pole member allows it to be disassembled into smaller components for storage and transport. The lower-most section 62 of the pole 20 has a sharpened end 66 so that the pole can be embedded in the ground at a convenient cooking site. In the alternative, as shown in FIG. 7, a supporting foot member 68 can be provided on the bottom of the pole 20. The member 68 provides stability for the portable cooking device on hard ground surfaces.

At the ends of the grates 22 and 24 opposite to the support pole 20 are provided a pair of V-shaped support members 70 and 72 (FIG. 9). The support members 70 and 72 are psoitioned in "eye"-rings 74 and 76, respectively, which are permanently secured to the grates. The lower ends of the support members 70 and 72 rest on the ground 80 or are embedded slightly in it.

FIG. 10 shows an alternate form of support member 82 which has a formed recess 84 used to support a pin 86 (or "eye"-ring). Either one or both of the support members 70 and 72 can be replaced with such an alternate support member 82.

In order to accommodate uneven ground surfaces, the pole 20 can be imbedded deeply or shallowly, the fire and cooking grates 22 and 24 can be adjusted upwardly or downwardly as desired, and the end support members 70 and 72 can be angled outwardly or inwardly relative to vertical as needed.

FIG. 11 shows another alternate mechanism for supporting the grates 22 and 24. The lower (fire) grate 22 is supported by a V-shaped support member 70 in the same manner as the embodiment shown in FIGS. 1 and 9. The upper (cooking) grate 24, however, is supported by a chain 88. The chain 88 is attached at one end 90 to the top of the pole 20 and at the other end 92 to grate 24. (The chain 88 can also be provided in a V-shape which is attached at its apex to the pole 20 and at its two spaced ends to opposite sides of the grate 24 (not shown).)

The present invention has a number of components which can be disassembled into individual or smaller sections for transportation and storage (pole and end support members). Similarly, the cooking and fire grates can be folded approximately in half to reduce their size. If desired, a canvas or leather carrying pouch can be provided to hold all of the disassembled and separated components.

When the portable grill 18 is being set up, the various components can be arranged in a wide variety of positions. Due to the slidable assembly of the sleeve members 50 on the pole 20, the two grates can be located and firmly held in place at any position along the height of the pole. The set screw 54 merely has to be loosened and then retightened after the sleeve is moved along the pole to the desired position. In the same manner, the grates can be positioned at any location 360° around the pole. This last feature is shown schematically in FIG. 12.

In typical use, the fire grate 22 is positioned directly below the cooking grate 24, as shown in FIG. 1. The lower grate (or fire grate) is positioned on the pole 20 with the sides 34 of the frame 32 extending upwardly. This provides a containment area for placement of the charcoal or other fire materials. The upper grate (or cooking grate) is positioned on the pole 20 with the sides 34 of the frame 24 extending downwardly. This allows the user to attend to and turn over the food being cooked more easily.

As indicated earlier, both grates 22 and 24 can be used for cooking. This could double the amount of food that can be cooked on the grill, or allow use of the second grill for food preparation or temporary holding of cooked items. When the two grates are both used for cooking, the fire can be positioned directly on the ground. FIG. 12 shows grate 22 positioned at a different location from grate 24 where they both can be used for cooking. Grate 24 alternately can be positioned at any other location 360° around the pole 20 relative to grate 22, such as at locations 24' or 24".

In a further alternate embodiment, the set screw and sleeve member can be comprised of two parts (not shown). A separate sleeve member having a set screw may be used as a stop upon which a tubular member attached to the grate rests. In use, the support pole is first inserted within the sleeve member and then the tubular member is positioned over the pole. When a desired elevation for the grate is located, the elevation may be maintained by bringing the sleeve member into contact with the tubular member and tightening the set screw against the support pole.

Figure 14:
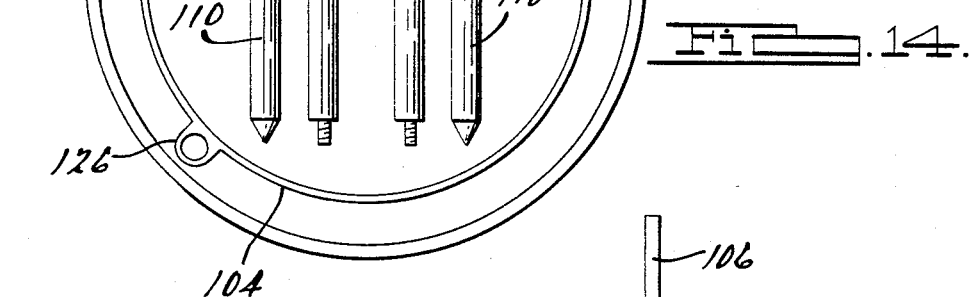
FIG. 14 depicts the grill of FIG. 13 in its disassembled condition and arranged for transport or storage.

Another preferred embodiment of the invention is shown in FIGS. 13 and 14. In this embodiment, the portable cooking grill is generally referred to by the reference numeral 100. The device 100 consists of a larger grate 102, a smaller grate 104 and a pair of vertical support member (or stakes) 106.

Both of the grates 102 and 104 are generally circular in shape and are sized so that the smaller one (104) will fit within the larger one (102) during storage and transport (as shown in FIG. 14). Each of the stakes 106 consists of two sections 108 and 110 which can be detached for storage in the same manner that support members 20 described above can be disassembled into separate pieces. Also, the ends 112 of stakes 106 are pointed for ease of embedding them into the ground for use.

The grate 102 has a metal wire mesh or grill-type surface 114 affixed to an outer frame 116. The rungs of the grate 102 are preferably chrome plated so they can be used longer and cleaned more easily. A pair of tubular sleeve members 118 are attached to the inner surface of the frame 116 on grate 102. The sleeve members 118 are adapted to slidingly hold one of the stakes 106 in them. Set screws, such as thumbscrews 120, are provided to releasably secure the sleeve members 118 to the stakes 106.

The grate 104 is similar to grate 102, except for its size and positioning of the sleeve members. The grate 104 has a wire mesh or grill-type surface 122 affixed to an outer frame 124. A pair of tubular sleeve members 126 are permanently secured to the outside of the frame 124.

The stakes 106 fit within the sleeve members 126 and are held in place by thumbscrews 120.

As shown in FIG. 13, the sleeve members 118 are positioned inside the perimeter of the larger grate 102 and the sleeve members 126 are positioned outside the perimeter of the smaller grate 104. In this manner, the sleeve members 118 and 126 will be vertically aligned when the cooking device 100 is assembled for use and the stakes 106 are inserted in them.

When the portable cooking grill 100 is disassembled, the pieces are all dimensioned such that they can be fit together in one package for transport and storage. As shown in FIG. 14, the sections 108 and 110 of the stakes 106 and the four thumbscrews 120 can all be fit within the smaller grate 104. The smaller grate in turn can fit within the larger grate 106. Preferably, the larger grate has a diameter on the order of 15 inches and the smaller grate has a diameter on the order of 13 inches. Also, a pouch or container (not shown) can be provided to hold all of the disassembled components.

FIG. 13 shows the preferred manner of assembly for the device 100. The grate 102 and 104 are supported on two sides by the stakes 106 and the grate can be positioned at any desired vertical location along the stakes. The lower grate is the fire grate and can be used for holding and containing the charcoal or other fire materials. The upper grate is the cooking grate and is used for holding and cooking of the food.

Figure 15:
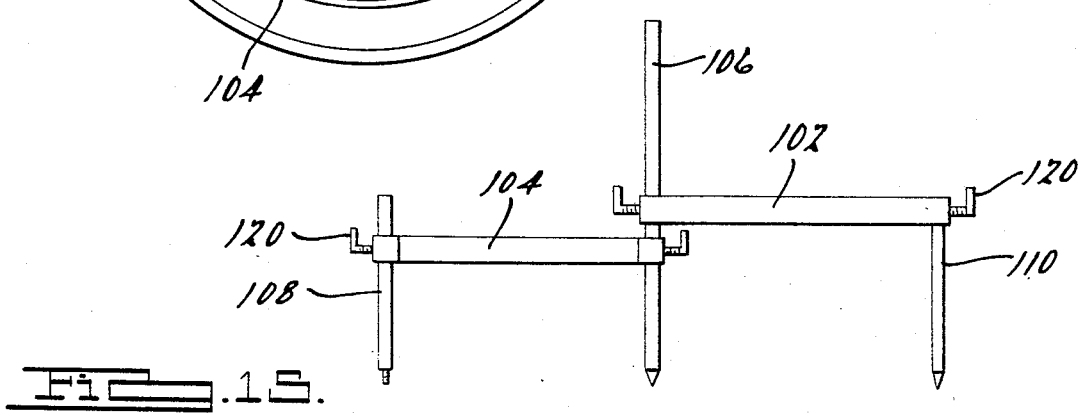
FIG. 15 shows an alternate manner of use of the grill of FIG. 13.

Alternatively, the smaller grate 104 can be positioned on top of the larger grate 102, the grates 107 and 104 can be assembled with their grill-type surfaces positioned either upwardly or downwardly, or both grates 102 and 104 could be spread apart and each used for cooking over fires placed on the ground. In the latter situation, as shown in FIG. 15, one of the stakes 106 would be used as a common stake to secure one end of each grill 102 and 104, while both portions 108 and 110 of the other stake could be used to hold the other ends of the grills.

Obviously, many variations in shape, size and in the materials which could be used are within the spirit of the invention disclosed in the above specification. Accordingly, it is to be understood that the scope of the present invention is not to be limited by the specific illustrative examples shown and described therein but rather by the scope of the language of the appended claims.

What is claimed is:

1. A portable cooking device comprising
    first support means, said support means being comprised of at least two sections which are releasably connected together,
    first grate member releasably mounted on said first support means,
    first mounting means for mounting said first grate member on said first support means, said first mounting means allowing said first grate member to be positioned at a plurality of points along said first support means and substantially at any angle of orientation around the perimeter thereof,
    said first grate member comprising at least two sections, said section being pivotally joined together and adapted to be folded over adjacent one another for compact storage of said first grate member,
    second grate member releasably mounted on said first support means,
    second mounting means for mounting said second grate member on said first support means, said second mounting allowing said second grate member to be positioned at a plurality of points along said first support means and substantially at any angle of orientation around the perimeter thereof,
    said second grate member comprising at least two sections, said sections being pivotally joined together and adapted to be folded over adjacent one another for compact storage of said second grate member, and
    second support means for holding and securing said first and second grate members relative to the ground.

2. The portable cooking device as set forth in claim 1 wherein said second grate member has means for holding cooking coals thereon.

3. The portable cooking device as set forth in claim 2 wherein said means for holding cooking coals thereon comprises wall means.

4. The portable cooking device as set forth in claim 1 wherein said second support means comprising a first support means attached to said first grate member and a second support member attached to said second grate member.

5. The portable cooking device as set forth in claim 4 wherein said first support member is mounted to said first grate member at one end and is supported by the ground, and said second support member is mounted to said second grate member and supported by said first support means.

6. The portable cooking device as set forth in claim 1 wherein said first support means is pole shaped with a tapered end thereon for insertion in the ground.

7. The portable cooking device as set forth in claim 4 wherein said second support means comprises at least one inverted V-shaped member.

* * * * *

UNITED STATES PATENT AND TRADEMARK OFFICE
CERTIFICATE OF CORRECTION

PATENT NO. : 4,589,399

DATED : May 20, 1986

INVENTOR(S) : Stephen D. Hamill, et al.

It is certified that error appears in the above-identified patent and that said Letters Patent is hereby corrected as shown below:

| | | |
|---|---|---|
| Column 1, line 16 | "accomodate" should be --accommodate--. | |
| Column 1, line 37 | "removeably" should be --removably--. | |
| Column 3, line 30 | "psoitioned" should be --positioned--. | |
| Column 3, line 40 | "imbedded" should be --embedded--. | |
| Column 4, line 14 | "24" should be --32--. | |
| Column 5, line 24 | "grate" should be --grates--. | |

UNITED STATES PATENT AND TRADEMARK OFFICE
CERTIFICATE OF CORRECTION

PATENT NO. : 4,589,399

DATED : May 20, 1986

INVENTOR(S) : Stephen D. Hamill, et al.

It is certified that error appears in the above-identified patent and that said Letters Patent is hereby corrected as shown below:

Column 6, line 20
Claim 1     after "mounting" insert --means--."

Signed and Sealed this

Twentieth Day of January, 1987

Attest:

DONALD J. QUIGG

*Attesting Officer*     *Commissioner of Patents and Trademarks*